(12) United States Patent
Reddy et al.

(10) Patent No.: US 8,745,655 B2
(45) Date of Patent: Jun. 3, 2014

(54) EMERGENCY ALERTS DURING PLAYBACK OF VIDEO STREAMS ON PORTABLE DEVICES

(75) Inventors: Sachinder D. Reddy, Allen, TX (US); Enrique Ruiz-Velasco, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 372 days.

(21) Appl. No.: 12/969,726

(22) Filed: Dec. 16, 2010

(65) Prior Publication Data
US 2012/0159533 A1 Jun. 21, 2012

(51) Int. Cl.
*H04N 7/167* (2011.01)
*H04N 21/81* (2011.01)

(52) U.S. Cl.
CPC .................................. *H04N 21/814* (2013.01)
USPC .............................................. 725/31; 725/33

(58) Field of Classification Search
CPC ............................... H04N 21/814; H04L 9/065
USPC ..................... 725/32–35, 62, 25, 31
See application file for complete search history.

(56) References Cited

U.S. PATENT DOCUMENTS

| | | | |
|---|---|---|---|
| 5,703,948 A * | 12/1997 | Yanovsky | 380/262 |
| 7,592,912 B2 * | 9/2009 | Hasek et al. | 340/539.16 |
| 2004/0010807 A1 * | 1/2004 | Urdang et al. | 725/136 |
| 2010/0184486 A1 * | 7/2010 | Gupta | 455/567 |
| 2010/0211972 A1 * | 8/2010 | Howarter et al. | 725/33 |

* cited by examiner

*Primary Examiner* — Benjamin R Bruckart
*Assistant Examiner* — Jason Thomas

(57) ABSTRACT

Video content that is streamed to portable devices may be interrupted based on an emergency alert system (EAS) broadcast. In one implementation, first video content may be streamed over an Internet Protocol (IP) network to a portable device and an indication of a location of the portable device may be determined. Whether the location of the portable device is in a geographic region covered by an EAS broadcast may also be determined. When the portable device is determined to be in the geographic region covered by the EAS broadcast, a notification may be transmitted to the portable device, where the notification instructs the portable device to interrupt the first video content with video content corresponding to the EAS broadcast. The video content corresponding to the EAS broadcast may be streamed to the portable device.

21 Claims, 11 Drawing Sheets

EMERGENCY ALERTS DURING PLAYBACK OF VIDEO STREAMS ON PORTABLE DEVICES

BACKGROUND

Video content (e.g., television broadcasts, pay-per-view (PPV) content, video-on-demand (VOD) content, etc.) may be delivered and selected in several ways. For example, television channels may be broadcast to users. Traditionally, television broadcasts have been viewed on televisions sets. More recently, users have been offered the ability to view television broadcasts on other devices, such as desktop computers, portable computers, and portable communication devices.

Content owners may wish to place limits on how a user is allowed to view video content. For example, certain content may only be available to subscribers of a certain "premium" channel or other service. As another example, some subscribers may be given immediate access to certain content while other subscribers, such as those subscribing to a more basic level of service, may be required to wait a certain time period before being able to view the content.

Certain video content, such as live television broadcasts, may be subject to interruptions from the emergency alert system (EAS). The EAS is a national public warning system that requires broadcasters, cable television systems, wireless cable systems, satellite digital audio radio service (SDARS) providers, and direct broadcast satellite (DBS) providers to provide the communications capability to address the public during a national emergency. The EAS is also used by state and local authorities to deliver important emergency information, such as AMBER alerts and weather information targeted to specific areas.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Systems and/or methods described herein may allow customers that are subscribed to a television service to view video content on devices, such as portable communication devices, other than the customers' televisions. Some video content, such as video content corresponding to live television broadcasts, may be subject to interruption for EAS broadcasts. Other video content, however, such as a pay-per view program, may not be subject to interruption for EAS broadcasts. Systems and/or methods described herein may enable the interruption of certain video content, transmitted to portable devices via Internet Protocol (IP) networks, for EAS broadcasts.

Figure 1:
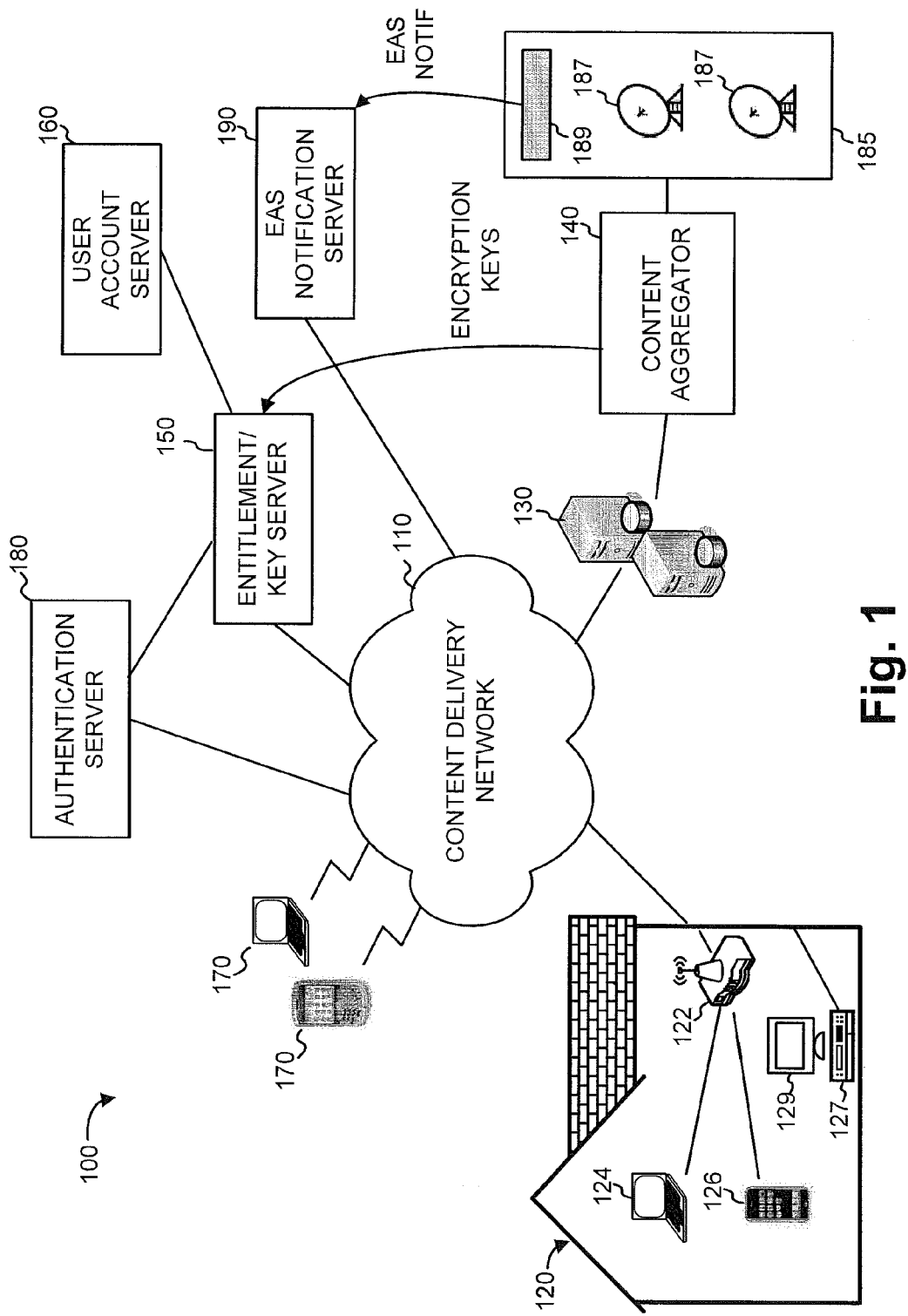
FIG. 1 is a diagram of an example environment in which systems and/or methods described herein may be implemented.

FIG. 1 is a diagram of an example environment 100 in which systems and/or methods described herein may be implemented. As illustrated, environment 100 may include a content delivery network 110, customer premises 120, content servers 130, content aggregator 140, entitlement and/or key server 150, user account server 160, computing devices 170, authentication server 180, content reception component 185, and EAS notification server 190. Customer premises 120 may include one or more devices that can connect to content delivery network 110, such as wireless router 122, laptop computer 124, portable device 126, set-top box (STB) 127, and/or television 129. Other computing devices 170, such as laptop computers and portable communication devices, may also connect to content delivery network 110. Content reception component 185 may include one or more devices, such as satellites 187 and EAS message generator 189, through which content (e.g., television content and/or EAS broadcasts) is received.

Content delivery network 110 may generally include a local area network (LAN), a wide area network (WAN), a metropolitan area network (MAN), a wireless network, an optical fiber (or fiber optic)-based network, a cable television network, a satellite television network, or a combination of networks. Content delivery network 110 may, in one implementation, include an IP-based network. In some implementations, content delivery network 110 may be a private network controlled by, for example, a telecommunications company that provides television, telephone, and/or data access to customer premises 120. Additionally, or alternatively, content delivery network 110 may include a public network, such as the Internet.

Customer premises 120 may include a residential or business entity that is connected to content delivery network 110 by a service provider (e.g., a telecommunication company). Customer premises 120 may be connected to content delivery network 110 using, for example, a fiber optic connection, a coaxial connection, a satellite connection, or another type of wireless or wired connection. A gateway device may be used to connect customer premises 120 to content delivery network 110. For example, for a fiber optic connection, an optical network terminal (ONT) may convert the optical signals into an electrical format that can be used by wireless router 122. Alternatively, the functionality of the ONT may be incorporated into wireless router 122. Devices in customer premises 120 may include, for example, STBs (e.g., STB 127), televisions (e.g., television 129), computers (e.g., laptop computer 124), portable devices (e.g., portable device 126), and home networking equipment (e.g., routers, cables, splitters, local gateways, etc.). Devices within customer premises 120 may be connected via wired connections (e.g., coaxial cable, Telecommunications Industry Association category 5 ("cat 5") cable, etc.) and/or wireless connections (e.g., using network devices such as those available under the IEEE 802.11 wireless LAN standards). In the example shown in FIG. 1, customer premises 120 includes wireless router 122, which connects laptop computer 124 and portable device 126 to content delivery network 110. Additionally, STB 127 is shown as connecting to a television 129. STB 127 may be used to control the content shown on television 129 and may connect to content delivery network 110 via a wired connection.

Content servers 130 may include one or more server devices that store content, such as video content, that may be delivered to customer premises 120 and/or other computing devices 170. The content may include, for example, television broadcasts, video-on-demand programming, or other video content. Content servers 130 may deliver the stored content as on-demand streaming content. The television programming may be stored and made available, by content servers 130, in real-time or near real-time relative to the original broadcast of the television programming. In addition to storing video content, content servers 130 may store other information, such as index information that provides links to keys needed to decrypt the content.

Content aggregator 140 may aggregate content, such as television programming. Content aggregator 140 may receive the content from content reception component 185. Content aggregator 140 may, for example, receive signals for national television channels and local television programming. Content aggregator 140 may also receive EAS broadcasts from, for example, one or more government agencies. In one implementation, content aggregator 140 may be distributed over a number of geographical regions. For example, content aggregator 140 may be present at each of a number of local markets, where the content aggregator associated with each local market may receive and store local programming for that market. In this situation, national television programming may be captured at a central facility and transmitted to each of the local content aggregators.

Content aggregator 140 may additionally encrypt its received content. In one implementation, content aggregator 140 may encrypt incoming video streams, using, for example, a symmetric encryption technique such as AES (Advanced Encryption Standard). The encrypted video streams may be encrypted as discrete sections in which the encryption is changed for each section. Content aggregator 140 may transmit the encryption keys to entitlement/key server 150. In some implementations, content aggregator 140 may not encrypt all of its content. For example, EAS broadcasts may be stored in an unencrypted form.

Entitlement/key server 150 may include one or more server devices that provide authentication and eligibility determinations for users that wish to view content stored at content servers 130. Entitlement/key server 150 may, for example, operate to authenticate the user and provide session decryption keys through which the user may decrypt content from content servers 130. In one implementation, user authentication may be provided with the assistance of a third party, such as a third party certificate authority, illustrated as authentication server 180.

User account server 160 may include one or more server devices that include account information for a customer. The account information may include information relating to programming (e.g., television channels), packages, or services to which a user has subscribed. User account server 160 may include other information relating to the users, such as the equipment installed at the customer premise. For example, a telecommunications company may provide each of customer premises 120 with a router, such as wireless router 122. Identification information for wireless router 120, such as a media access control (MAC) address associated with the router, or the IP address assigned to the router, may be stored by user account server 160. Entitlement/key server 150 may contact user account server 160 when performing entitlement checks and/or key delivery.

Computing devices 170 may include other computing devices, such as laptop computers and/or portable communication devices, that may connect to content delivery network 110. Portable devices from within customer premises 120, when taken outside of customer premises 120, may be referred to as computing devices 170.

Authentication server 180 may provide authentication services for users that wish to receive video streams from content servers 130. Authentication server 180 may, for example, receive and process HTTPS (hyper text protocol secure) requests from users. Authentication server 180 may communicate the results of an authentication to entitlement/key server 150. In some implementations, authentication may be performed by entitlement/key server 150 and the functionality of authorization server 180 may be incorporated into entitlement/key server 150.

Content reception component 185 may include one or more devices to receive content. As previously mentioned, content reception component 185 may include satellites 187 to receive local or national television programming. Content reception component 185 may also include EAS generator 189, which may receive EAS broadcasts, such as audio, video, or text broadcasts, from one or more sources. The one or more sources may include government entities. Content reception component 185 may additionally receive content over other communication channels, such as wired channels.

Content reception component 185 may provide received content to content aggregator 140. Additionally, in response to the reception of an EAS broadcast, content reception component 185 may provide a notification of the EAS broadcast to EAS notification server 190.

EAS notification server 190 may include one or more server devices that receive EAS notifications from content reception component 185. EAS notification server 190 may process the notifications to determine which devices (such as portable devices 126) are subject to the EAS broadcast. EAS notification server 190 may transmit EAS notifications to the determined devices. As will be described in more detail below, the EAS notifications may cause the affected devices to interrupt content currently being presented and instead present the EAS broadcast. EAS notification server 190 may communicate with entitlement/key server 150 to determine which devices are currently "online" (i.e., viewing steaming content from content servers 130).

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more tasks described as being performed by one or more other components of environment 100.

Figure 2:
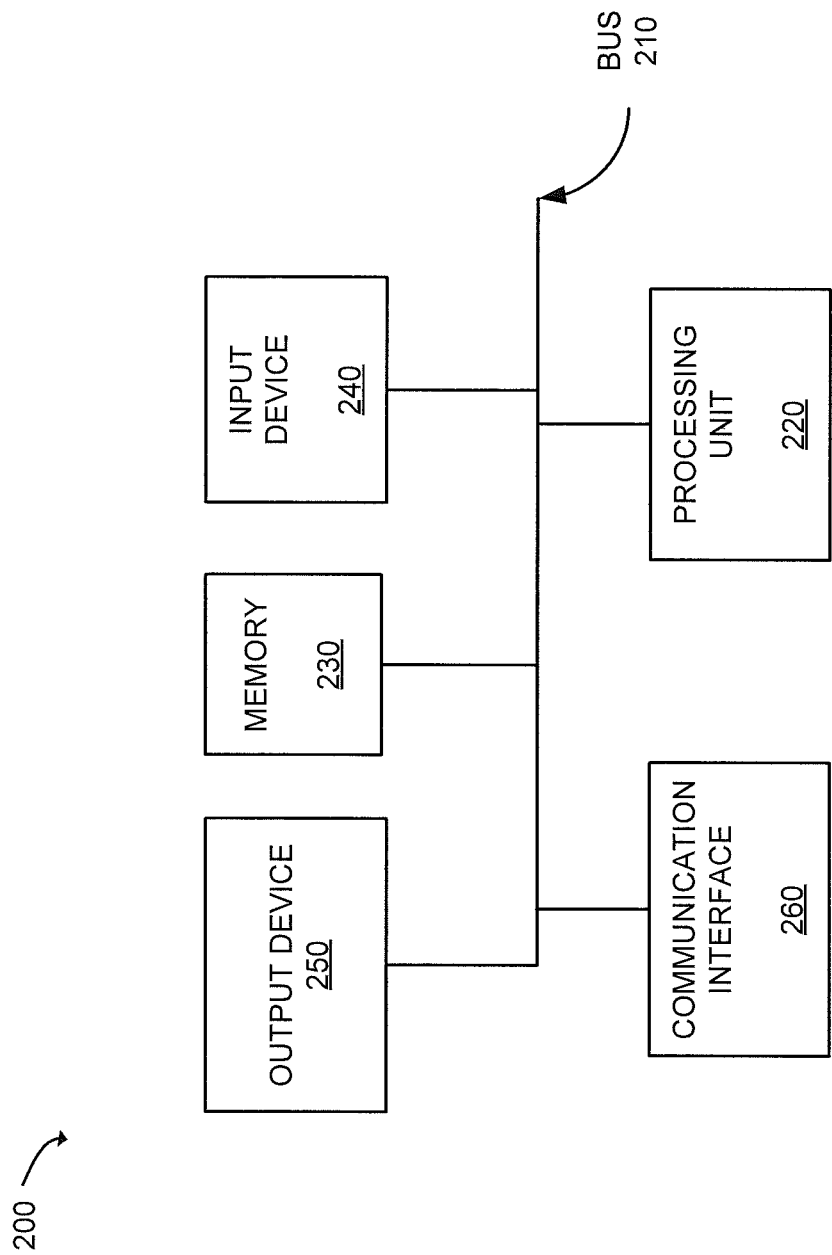
FIG. 2 is a diagram of example components of a device that may correspond to one of the devices of the environment shown in FIG. 1.

FIG. 2 is a diagram of example components of a device 200 that may correspond to one of the devices of environment 100 and/or customer premises 120. Device 200 may be included in, for example, content servers 130, content aggregator 140, entitlement key/server 150, user account server 160, authentication server 180, wireless router 122, laptop computer 124, portable device 126, set-top box 127, computing device 170, EAS generator 189, and/or EAS notification server 190. As illustrated, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include any transceiver-like mechanism that enables device 200 to communicate with other devices and/or systems. For example, communication interface 260 may include mechanisms for communicating with other devices, such as other devices of environment 100 and/or customer premises 120.

As described herein, device 200 may perform certain operations in response to processing unit 220 executing software instructions contained in a computer-readable medium, such as memory 230. A computer-readable medium may be defined as a non-transitory memory device. A memory device may include memory space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may contain fewer components, different components, differently arranged components, or additional components than depicted in FIG. 2. Alternatively, or additionally, one or more components of device 200 may perform one or more tasks described as being performed by one or more other components of device 200.

Figure 3:
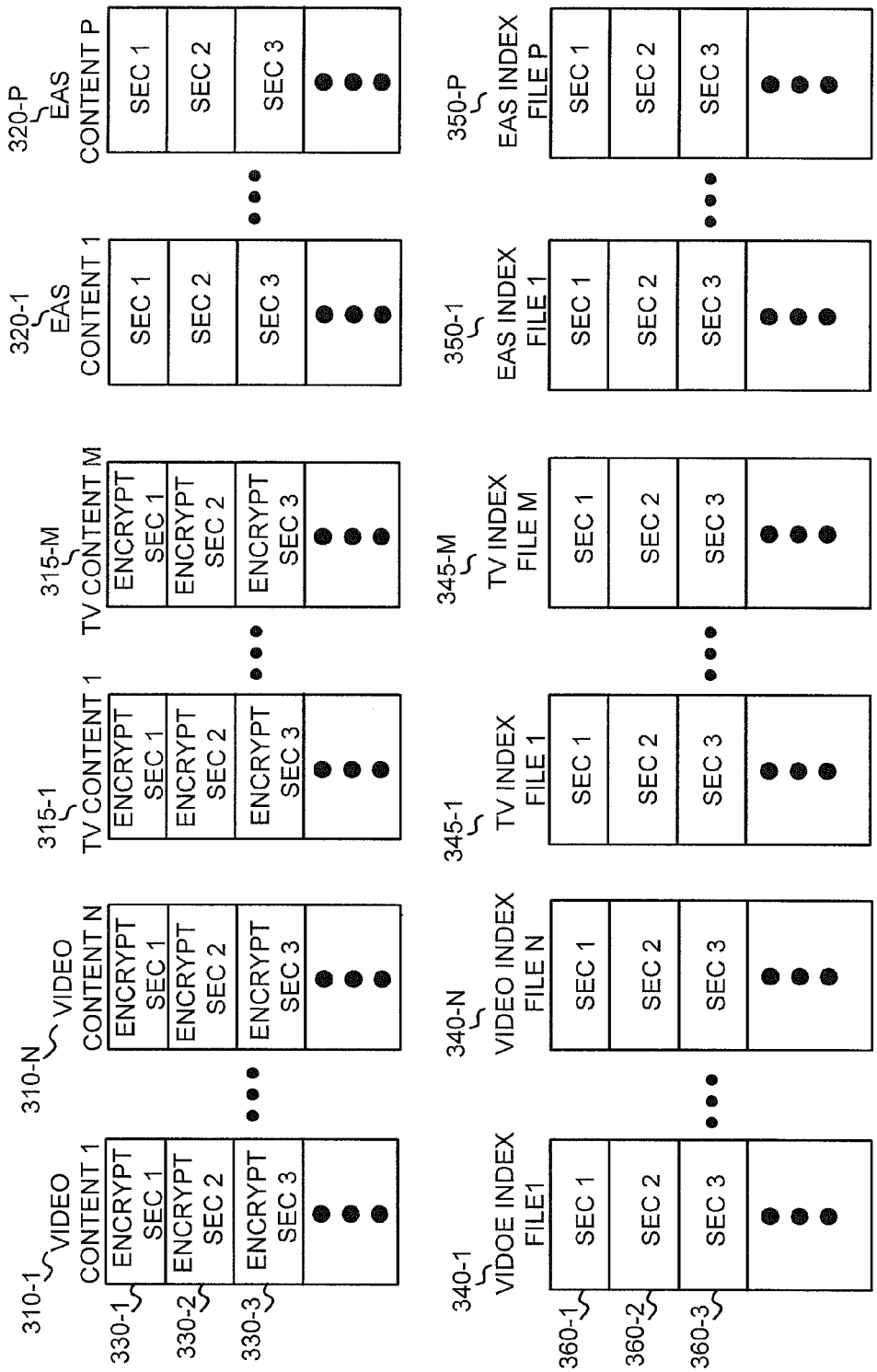
FIG. 3 is a diagram illustrating an example of data structures implemented by the content servers shown in FIG. 1.

FIG. 3 is a diagram illustrating an example of data structures implemented by content servers 130. As previously mentioned, content servers 130 may store content, such as television programming (live or delayed broadcasts), video on demand programming, programming related to EAS alerts (i.e., EAS broadcasts), or other types of content. The content may be received as streams of data from content aggregator 140. The streams may each be encrypted by content aggregator 140, such as by using 128 bit AES encryption (or another encryption algorithm).

As shown in FIG. 3, content received and stored by content servers 130 is illustrated as including video content items 310-1 (video content item 1) through video content item 310-N (video content item N), television content item 315-1 (tv content 1) through television content item 315-M (tv content M), and EAS content item 320-1 (EAS content 1) through EAS content item 320-P (EAS content P). Each video content item 310 may include, for example, on-demand video content that may be selected by the user at the user's convenience. Each television content item 315 may include content that corresponds to a particular television channel. Television content item 315 may be "live" content in the sense that the content, when selected, corresponds to what is being shown on the corresponding television channel. EAS content items 320-1 through 320-P may correspond to EAS broadcasts. The EAS broadcasts may be, for example, created by a government or other official entity in response to a need to inform the public about an emergency situation. EAS content item 320 may be broadcasts that include video, audio, and/or text.

Content items 310, 315, and 320 may be divided into sections, in which each section may be encrypted using a different encryption key. Video content item 310-1, for example, is shown as including multiple sections, including section 330-1 (encrypt section 1), 330-2 (encrypt section 2), and 330-3 (encrypt section 3). The length of each section 330 may be, for example, based on a certain time duration (e.g., 30 minute sections), a target section size, or based on other factors. For television content items 315, each section may correspond to a separate show or program.

In one implementation, each EAS content item 320 may correspond to a separate EAS broadcast. In this situation, each EAS content item 320 may be a single section. Alternatively, and as shown in FIG. 3, each EAS content item may be divided into multiple sections. EAS content items 320 may or may not be encrypted. EAS content items 320 may generally be generated by a national government agency during a national emergency or by local authorities to deliver emergency information, such as AMBER alerts, weather information targeted to specific areas, etc.

Content servers 130 may also store an index file relating to each of the content items 310, 315, and 320. The index files are shown in FIG. 3 as including: video index files 340-1 through 340-N, which may correspond to video content items 310-1 through 310-N; television index files 345-1 through 345-M, which may correspond to television content items 315-1 through 315-M; and EAS index files 350-1 through 350-P, which may correspond to EAS content items 320-1 through 320-P. Each index file 340, 345, and 350 may include information corresponding to the corresponding sections, such as sections of content items 310, 315, or 320. Index file 340-1, for example, is illustrated as including sections, 360-1, 360-2, and 360-3, which may correspond to content sections 330-1, 330-2, and 330-3, respectively, of video content item 310-1. Each section 360 may include, for example, information such as the beginning and end of the section, a link or other resource indicating the location of the decryption key file for the section, and/or descriptive information relating to the section. In one implementation, each of the index sections, such as index sections 360, may include a uniform resource locator (URL) that points to a resource on entitlement/key server 150 at which the decryption key file for the corresponding content can be obtained.

By dividing a content item 310, 315, 320 into sections, the decryption key for the content item may be rotated. Each key rotation (i.e., each new section 330), may require the viewing device (e.g., computing device 170, etc.) to re-request the appropriate key file. Accordingly, a viewing device that becomes ineligible to receive the content may be denied access to the content.

Although FIG. 3 shows example components (e.g., data structures) stored by content servers 130, in other implementations, content servers 130 may contain fewer components, different components, differently arranged components, or additional components than depicted in FIG. 3.

Figure 4:
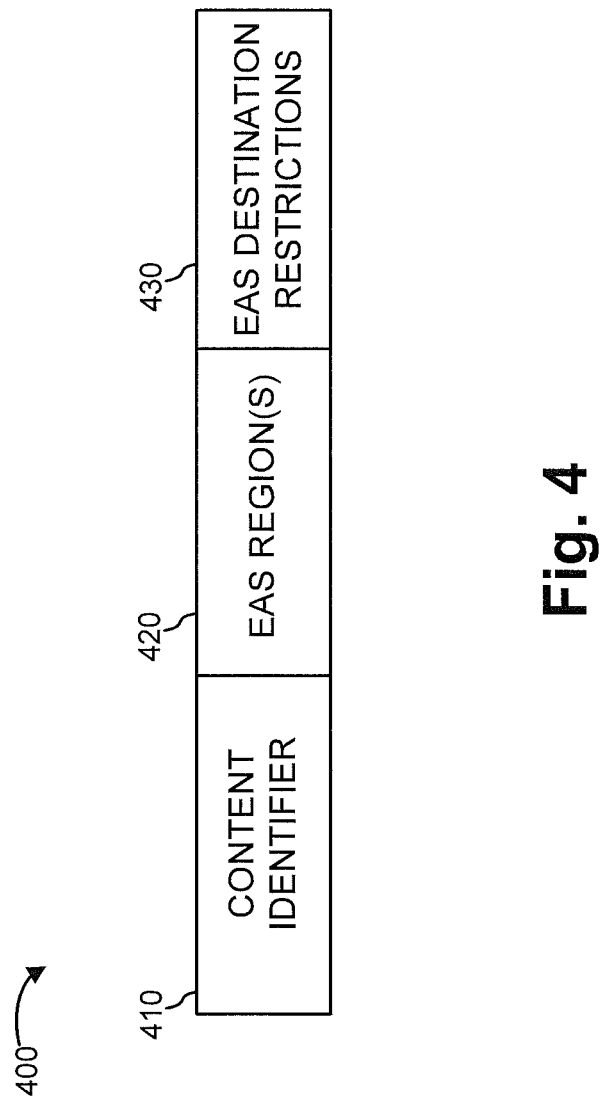
FIG. 4 is a diagram illustrating an example data structure that may store information relating to an EAS broadcast.

FIG. 4 is a diagram illustrating an example data structure 400 that may store information relating to an EAS broadcast. Data structure 400 may be generated by, for example, EAS message generator 189 in response to reception of a new EAS broadcast from a government agency. Data structure 400 may be transmitted to EAS notification server 190, which may, in response, transmit notifications to network devices, such as devices 124, 126, and 170, that are affected by the corresponding EAS broadcast Data structure 400 may include content identifier field 410, EAS region(s) field 420, and EAS destination restrictions field 430. Content identifier field 410 may include information identifying the particular EAS content, such as a video or audio file, that is to be broadcast. Content identifier field 410 may, for example, include a link or other reference to one of EAS content items 320-1 through 320-P.

EAS region(s) field 420 may include information that identifies one or more geographic regions to which the identified EAS content item is to be broadcast. EAS region(s) field 410 may include, for example, regions labels (e.g., "region1", "new york city area", etc.) that indicate certain geographic areas to which the identified EAS content item should be transmitted. Alternatively or additionally, geographic areas may be identified using other techniques, such as by specifying an area using points in a coordinate system (e.g., longitude and latitude).

In some implementations, EAS destination restrictions field 430 may be used to specify which portable devices are affected by the corresponding EAS broadcast. It may be desirable, or a legal requirement, that a certain set of customers viewing video content items 310 and/or 315 may be subject to the EAS broadcast. For example, only customers viewing content corresponding to "live" (i.e., not time delayed) television channel may be subject to EAS broadcasts. As another example, all customers viewing content corresponding to television signals may be subject to the EAS broadcasts. In yet another possibility, all customers, whether viewing television signals or other type of content (e.g., pay-per-view movies) may be subject to the EAS broadcast. EAS destination restrictions field 430 may specify which customers are affected by specifying one or more rules, codes, or other information that can be interpreted by EAS notification server 190 or by the portable devices, such as portable device 124, to determine whether a particular device should be shown the EAS broadcast. In some implementations, the information contained in EAS destination restrictions field 430 may be "hardcoded" into environment 100, and in this case, EAS destination restrictions field 430 may not be included in data structure 400.

Data structure 400 illustrates a number of example fields that may be associated with an EAS broadcast. In alternative implementations, additional or fewer fields may be used.

Figure 5:
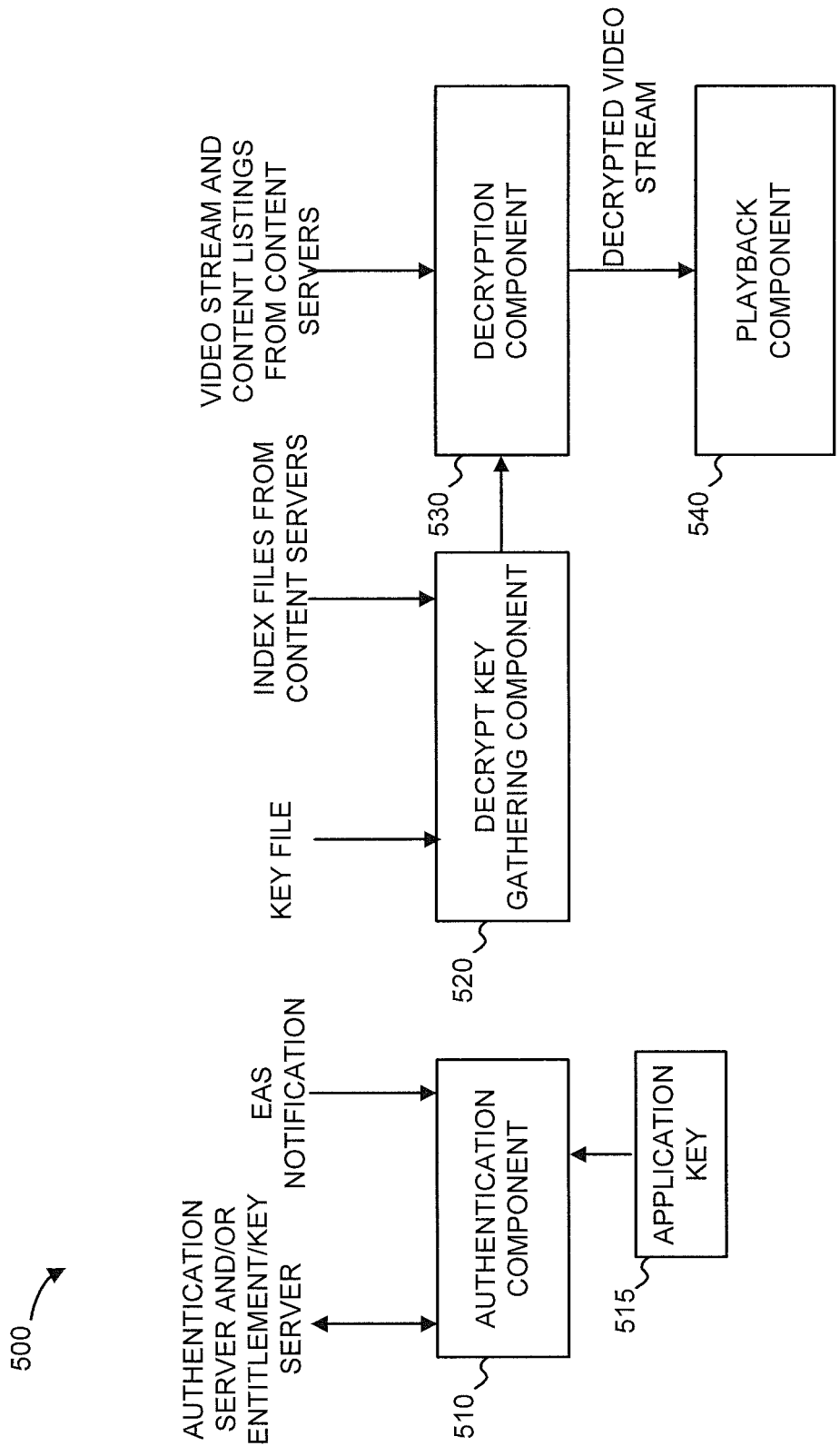
FIG. 5 is a diagram illustrating an example of functional components of a playback application.

FIG. 5 is a diagram illustrating an example of functional components of a playback application 500, such as an application run on a portable computing/communication device (e.g., laptop computer 124, portable device 126, computing devices 170). Playback application 500 may be particularly designed to display content that is entitled to be played back by the user, receive a user's selection of content items, and playback the selected content item. In this manner, a user can enjoy video content items, which may be derived from traditional television programming.

As shown in FIG. 5, playback application 500 may include an authentication component 510, an application key 515, a decrypt key gathering component 520, a decryption component 530, and a playback component 540.

Authentication component 510 may communicate with authentication server 180 and/or entitlement/key server 150 to authenticate the user of playback application 500 and to obtain permission to view a selected program. EAS notifications, from EAS notification server 190, indicating that a particular EAS broadcast should be played by playback application 500, may also be received by authentication component 510. Decrypt key gathering component 520 may generally receive the index file 330 corresponding to selected content item (or to an EAS broadcast) and may obtain one or more decryption key files for the content item. Index file 330 may be obtained from content servers 130 and the decryption keys may be obtained from entitlement/key server 150. Decrypt component 530 may receive, for example, an encrypted version of the video stream from content servers 130. Using the obtained decryption key, decryption component 530 may decrypt an incoming video stream corresponding to the selected program. Playback component 540 may playback the decrypted video stream to the user, such as on an LCD display of the portable computing/communication device. The operation of the components of playback application 500, and its interaction with other elements of environment 100, will be described in more detail below with reference to FIGS. 6-11.

Application key 515 may be included as part of playback application 500. Application key 515 may be a value that is used by playback application 500 when authenticating playback application 500. In some implementations, different versions of playback application 500 may be released for different portable device platforms. In this case, application key 515 may be different for each portable device platform.

Although FIG. 5 shows example components of playback application 500, in other implementations, playback application 500 may contain fewer components, different components, differently arranged components, or additional components than depicted in FIG. 5. Alternatively, or additionally, one or more components of playback application 500 may perform one or more tasks described as being performed by one or more other components of playback application 500.

Figure 6:
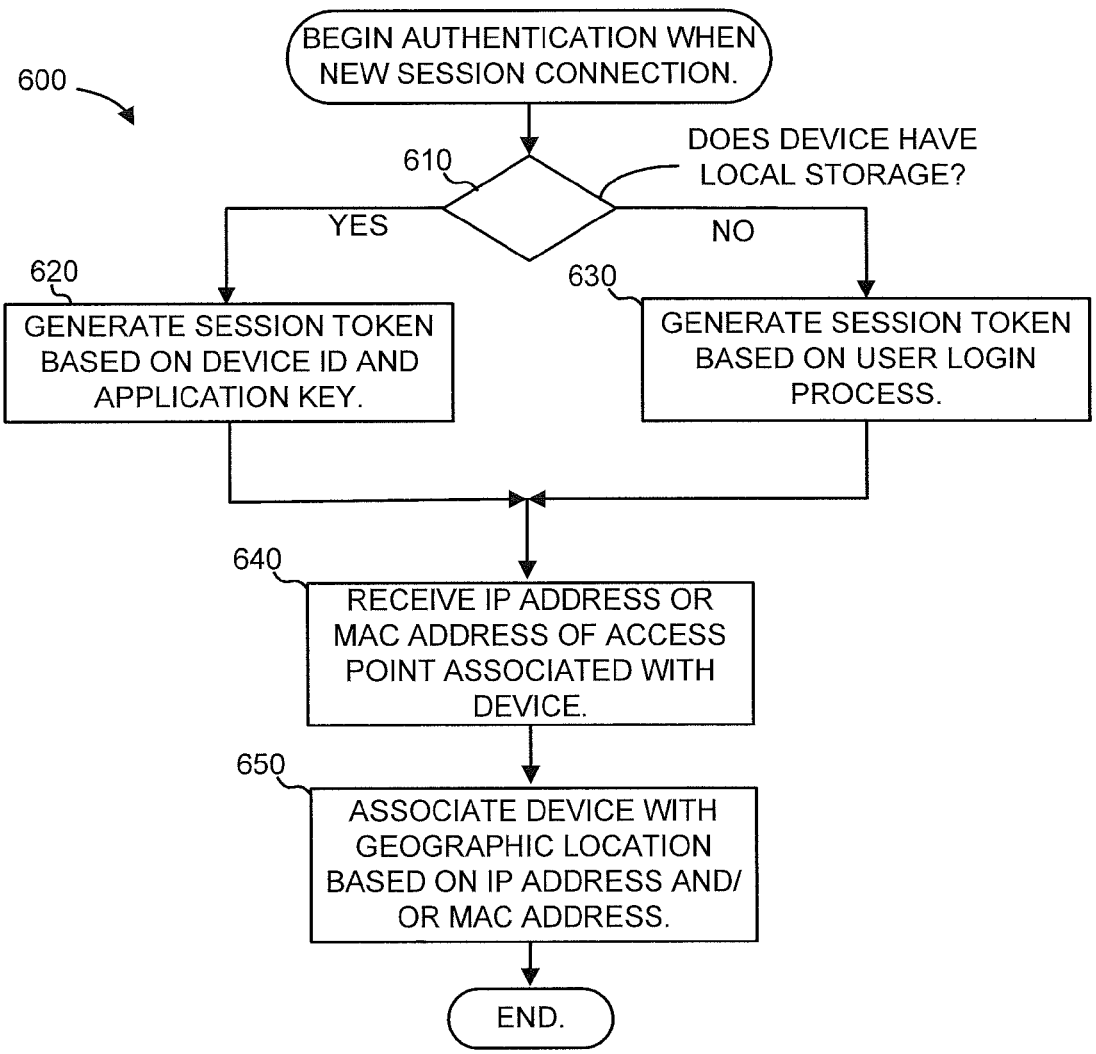
FIG. 6 is a flow chart illustrating an example process for authenticating a playback application.

FIG. 6 is a flow chart illustrating an example process 600 for authenticating playback application 500, executing at a portable device, to playback requested video content. Process 600 may be performed by playback application 500 whenever playback application 500 is initiated or whenever a new session is established by the portable device. A new session may be established by the portable device whenever the portable device connects to a new access point (e.g., wireless router 122) or other network connection. For example, if the user moves from his home to a retail outlet, the user's session with wireless router 122 may be lost when the user moves out of range of wireless router 122 and a new session with a wireless router at the retail outlet may be established when the user moves into range of the wireless router at the retail outlet. Authentication may be performed when the user's portable device begins a new network session with wireless router 122 and again when the user connects to the wireless router at the retail outlet.

Authentication may be performed differently depending on whether the portable device includes local storage. Process 500 may thus include determining whether the portable device includes local (i.e., non-volatile) storage (block 610).

When the portable device includes local storage (block 610—YES), process 600 may include generating a session token based on a device identification value (ID) and based on an application key 515 (block 620). The device ID may be a value that is unique to the portable device hardware, such as a value stored in a read-only memory or other non-volatile memory of the portable device. An encrypted version of the session token may be transmitted to entitlement/key server 150 or another server, such as authentication server 180. In one implementation, the encrypted version of the token may be transmitted over an HTTPS session in which a third party server, such as authentication server 180, is used as part of the authentication.

When the portable device does not include local storage (block 610—NO), process 500 may include generating a session token based on a user login process (block 630). For example, the user may be required to enter an account ID and/or password. The account ID and/or password may be used to authenticate playback application 500 to entitlement/key server 150, which may then transfer the session key to the portable device.

Alternatively, instead of determining whether the portable device includes local storage, different versions of playback application 500 may be distributed for different portable devices/platforms. In this situation, whether playback application 500 generates a session token based on the operations of blocks 620 or 630, may be hardcoded into playback application 500.

Process 600 may further include receiving the IP address or MAC address associated with the access point that is being used by the portable device during the current session (block 640). This information may be received from the portable device as part of the initial authentication performed by playback application 500.

Process 600 may further include associating the portable device with a geographic location or region based on the received IP address or MAC address (block 650). Entitlement/key server 150 may, for example, compare the received IP or MAC address to the corresponding IP or MAC address that is currently associated with the user's account. Entitlement/key server 150 may look up the expected IP or MAC address via a request to user account server 160. The IP address of the access point in customer premises 120 may, for example, be assigned to the access point by the company that provides playback application 500. Accordingly, this IP address may be known and associated with the customer's account. Similarly, the MAC address of the access point in customer premises 120 may be known and associated with the customer's account. In this case, the location of the portable device may thus be known as the address corresponding to the customer's account.

Other techniques for determining the user's location may also be used. For example, an IP address may, in general, be associated with geographic locations. For example, a certain IP address, even if it is determined to not correspond to a customer's premises, may be determined to be an IP address that is allocated to users of a particular city or other geographical region.

Still other techniques may alternatively be used to determine the geographic location of the user. For instance, some portable devices may include global positioning system (GPS) functionality through which the portable device can determine its location. Still further, other techniques for determining device location, such as triangulation using wireless base stations, may be used.

As will be described in more detail below, the determined location of the portable device may be used to determine whether the portable device is subject to a particular EAS broadcast.

Figure 7:
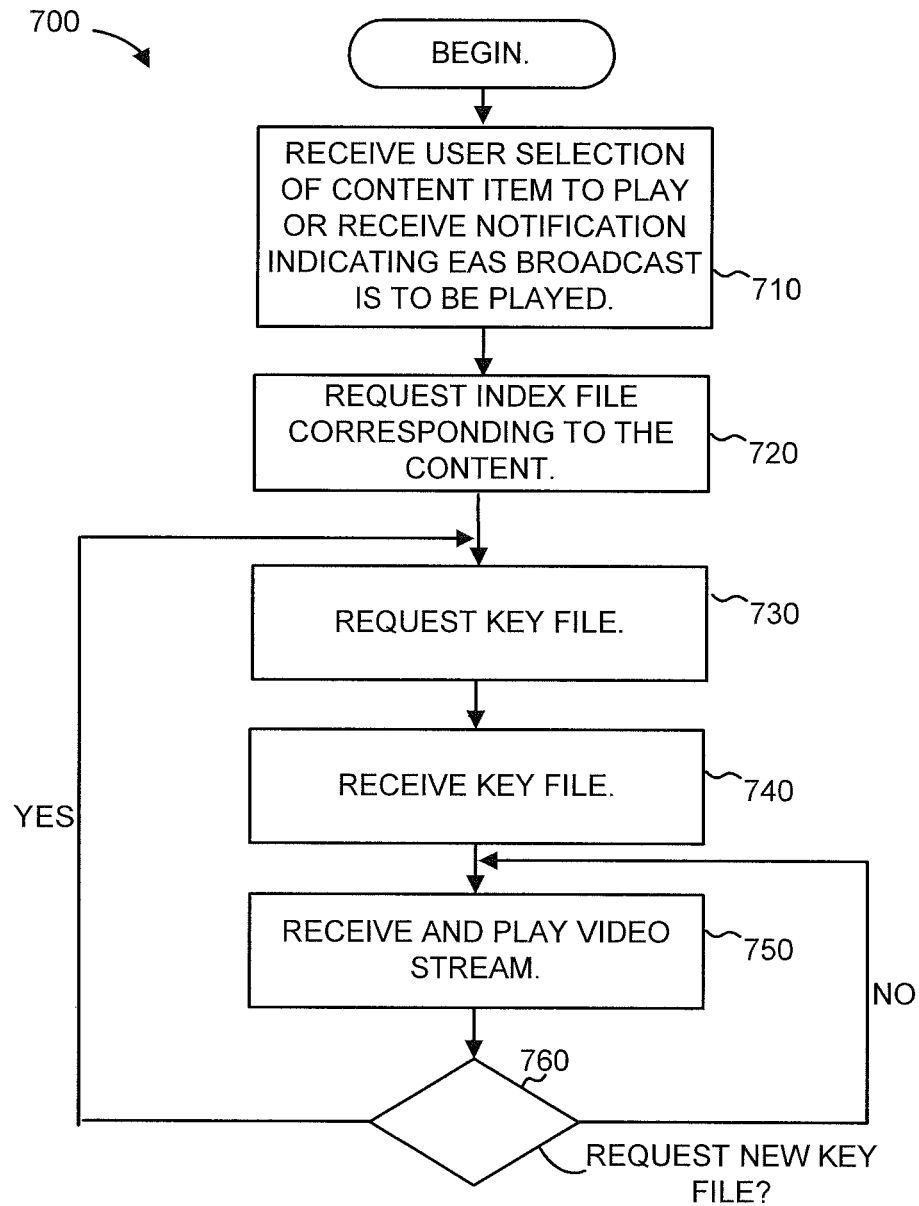
FIG. 7 is a flow chart illustrating an example process for receiving streaming content at a portable communication device.

FIG. 7 is a flow chart illustrating an example process 700 for receiving streaming content at a portable communication device (e.g., one of devices 124, 126, or 170). Process 700 may be performed, for example, by playback application 500, executing on a portable communication device.

At some point, the user of playback application 500 may select a particular content item to begin playback of the content item. Playback application 500 may receive the user's selection of the content item (block 710). Alternatively, playback application 500 may receive a notification indicating that an EAS content item 320 is to be played (block 710).

Process 700 may further include, in response to the selection of content to play, requesting the index file corresponding to the content (block 720). Decrypt key gathering component 520 of playback application 500 may, for example, request the index file corresponding to the content from content servers 130. The index file may include a link or other reference describing the resource to use to retrieve the decryption key for the content.

Process 700 may further include requesting the key file (block 730). For example, decrypt key gathering component 520 may use a link in the index file to request the key file, via an HTTPS (hyper text transfer protocol secure) request, from entitlement/key server 150. Decrypt key gathering component 520 may transmit, to entitlement/key server 150, the encrypted session token that was previously received during authentication of the portable communication device (e.g., as performed in process 500).

Process 700 may further include receiving the key file in response to the request made in block 730 (block 740). The key file may be received, for example, by decrypt key gathering component 520. The key file may include the decryption key needed to decrypt the requested content. In some implementations, the key file may include other information, such as an indication of when the decryption key expires (i.e., when a new key file should be requested).

Process 700 may further include receiving and playing the video stream from content servers 130 (block 750). Decryption component 530 of playback application 500 may receive the encrypted video stream from content servers 130. Decryption component 530 may use the key received in block 740 to decrypt the video stream. The video stream may then be played back to the user.

As mentioned previously, the key for a video stream may be changed at various times. Process 700 may further include determining if a new key file should be requested (block 760). The new key file may be requested periodically, based on a certain amount of received video content, or based on other factors. For example, each key file may include an indication of when the key in the key files expires. When it is time to request a new key file (block 760—YES), process 700 may return to block 730. Otherwise, the current key may continue to be used to playback the video stream (block 760—NO).

Figure 8:
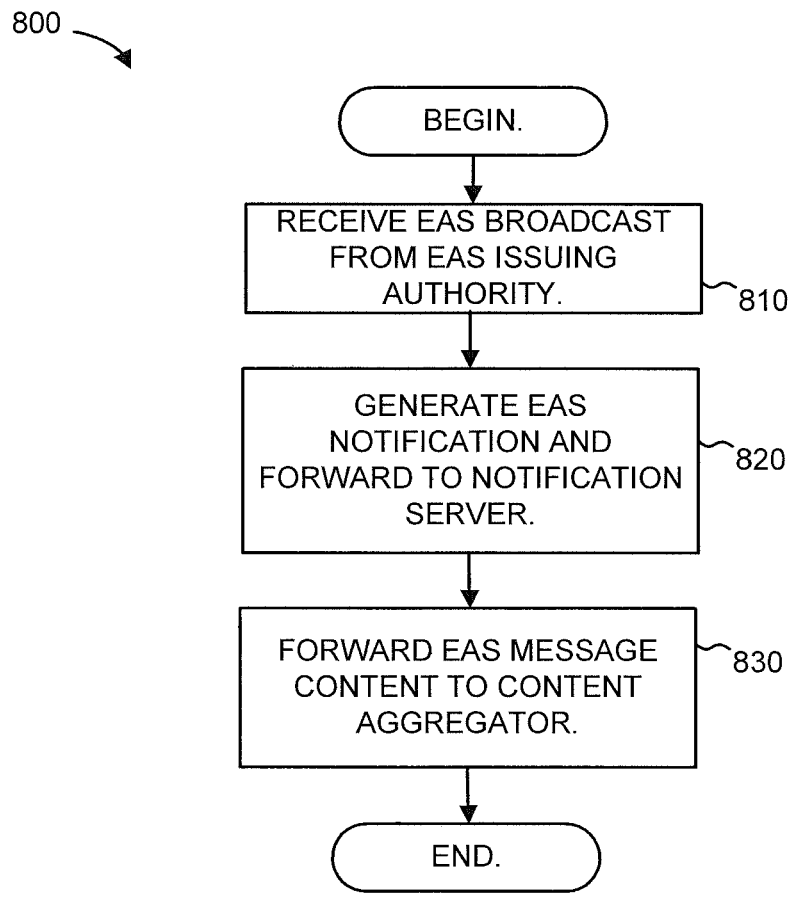
FIG. 8 is a flow chart illustrating an example process for initially processing EAS broadcasts received from an EAS issuing authority.

FIG. 8 is a flow chart illustrating an example process 800 for initially processing EAS broadcasts received from an EAS issuing authority (i.e., an authorized government entity).

Process 800 may include receiving an EAS broadcast from an EAS issuing authority (block 810). As previously mentioned, the EAS broadcast may be received by EAS generator 189. The EAS broadcast may include, for example, an over-the-air, satellite, or other type of transmission from the EAS issuing authority. EAS generator 189 may also receive an indication of the geographic region(s) to which the EAS broadcast applies. The indication of the regions may be embedded within the EAS broadcast or obtained in some other way, such as a separate communication from the EAS issuing authority.

EAS generator 189 may generate an EAS notification, such as the EAS notification illustrated in data structure 400, and forward it to notification server 190 (block 820). As previously mentioned, the EAS notification may include information indicating that an EAS broadcast has been received and may indicate the one or more regions to which the EAS broadcast is relevant and any content restrictions relating to the EAS broadcast.

Process 800 may further include forwarding the content, such as the video stream, corresponding to the EAS broadcast, to content aggregator 140 (block 830). Content aggregator 140 may then encode (e.g., encrypt) the video content and format it for storage by content servers 130.

Figure 9:
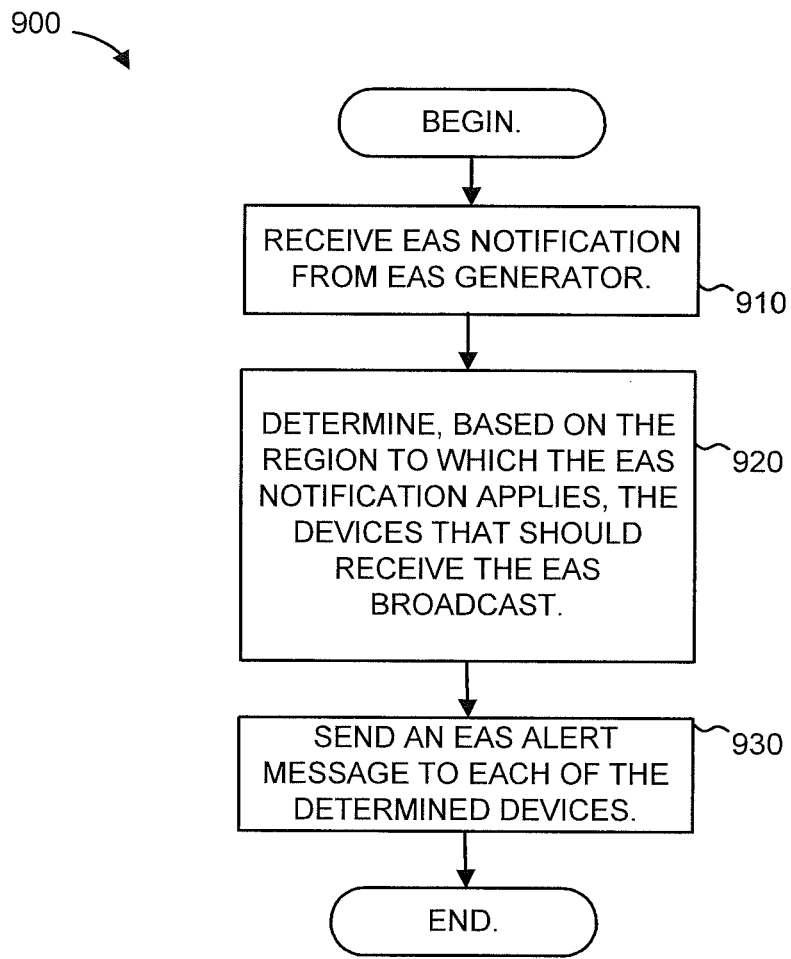
FIG. 9 is a flow chart of an example process for processing EAS notifications.

FIG. 9 is a flow chart of an example process 900 for processing EAS notifications. In one implementation, process 900 may be performed by EAS notification server 190.

Process 900 may include receiving an EAS notification, such as EAS notification 400, from EAS generator 189 (block 910). The EAS notification may act as a trigger to cause EAS notification server 190 to begin the process of instructing portable devices to present the corresponding EAS broadcast.

Process 900 may further include determining, based on the region to which the EAS notification applies, the portable devices (e.g., portable device 124, computing device 170, etc.) to which the EAS broadcast applies (block 920). The determination of block 920 may generally include comparing the regions in EAS region(s) field 420 with the geographic location or region associated with each "online" device (e.g., as determined during authentication) that is using playback application 500. In one implementation, notification server 190 may receive from, or communicate with, entitlement/key server 150 to obtain the region information applicable to each device.

As an example of the determination of devices that should receive an EAS broadcast, consider the situation in which a device is authenticated and associated with a geographic location that is based on the user's home address, which is in a region defined by a particular metropolitan area (e.g., the "Atlanta region"). EAS notification server 190 may determine that the portable device is subject to the EAS broadcast when the "Atlanta region" is included in EAS region(s) field 420 of an EAS notification. This determination may be made for each device that is receiving content from content servers 130.

In one possible alternative implementation, in addition to determining the devices to which the EAS broadcast should be sent based on the region(s) of the EAS notification, other factors, such as the type of content, may be used. For example, EAS notification server 190 may, based on EAS destination restrictions field 430 and the content currently being viewed by a device, determine whether the device should receive the EAS broadcast or whether the device is exempt from the EAS broadcast. For some types of content, such as television broadcasts, the content provider may be legally required to be able to interrupt the content for EAS broadcasts. For other types of content, however, such as, for example, on-demand video content, the content provider may not be legally required to support EAS broadcasts. Accordingly, EAS notification server 190 may also use information relating to the content being viewed by a device to determine the devices that should receive the EAS broadcast. Alternatively, the content-based determination of whether an EAS broadcast is to be presented on a device may be determined by playback application 500 based on rules that may be, for example, incorporated into playback application 500 by the content provider.

Process 900 may further include sending an EAS notification to each of the devices determined in block 920 (block 930). The EAS notification may indicate that playback application 500 is to, in place of or as a supplement to the content currently being shown by playback application 500, playback the EAS broadcast. Thus, the EAS notification may indicate that playback application 500 is to swap the content currently being viewed by the user with the EAS broadcast or may indicate that playback application 500 is to simultaneously display the content being viewed along with the EAS broadcast (e.g., in a split screen or other type of mode). The EAS notification may include fields similar to those of data structure 400.

Figure 10:
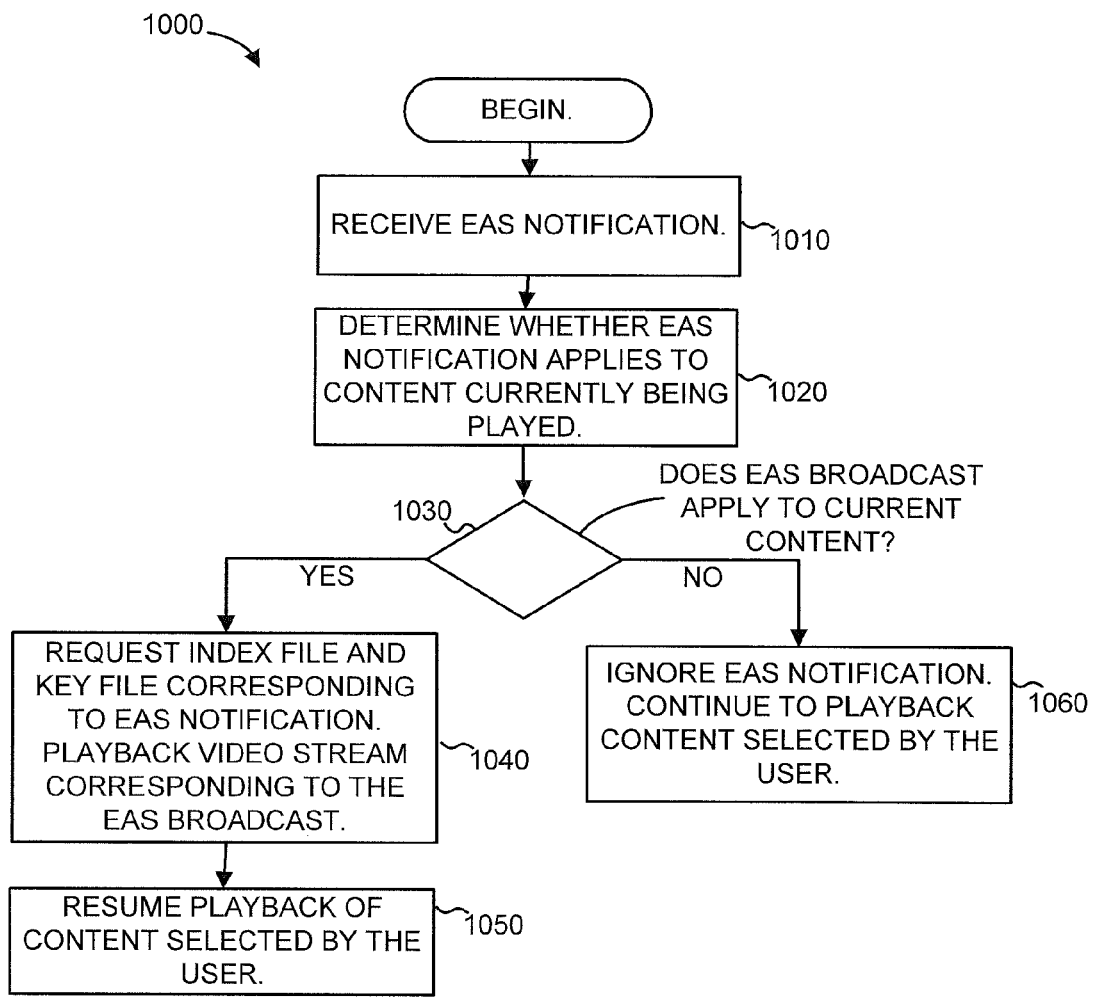
FIG. 10 is a flow chart of an example process for processing EAS alert messages by devices that receive the EAS alert messages.

FIG. 10 is a flow chart of an example process 1000 for processing EAS notifications by devices that receive the EAS notifications (e.g., as sent in block 930). Process 1000 may be performed, for example, by playback application 500 of the portable device.

Process 1000 may include receiving the EAS notification (block 1010). As previously mentioned, an EAS notification may be sent by EAS notification server 190 to each device to which an EAS broadcast is relevant. The EAS notification may include an indication of the content, at content servers 130, corresponding to the EAS broadcast. Additionally, the EAS notification may include an indication of the content to which the EAS broadcast is applicable. The indication of the content corresponding to the EAS broadcast and the indication of the content to which the EAS broadcast is applicable may be implemented using fields such as content identifier field 410 and EAS destination restrictions field 430 of data structure 400.

Process 1000 may further include determining whether the EAS notification applies to the content currently being played by the device (block 1020). As previously mentioned, in some implementations, certain types of content, such as video-on-demand content items, may be exempt from the EAS broadcast. Playback application 500 may determine, based on the EAS alert message, whether the content currently being played by playback application 500 is applicable to the EAS broadcast. Alternatively, this determination may be made by EAS notification server 190 and accordingly, this determination may not need to be made by playback application 500. In another alternative implementation, the EAS broadcasts may be applicable to all content items at content server 130. In this case, whether a device should play the EAS broadcast may be based solely on the geographical region of the device.

When the EAS broadcast is determined to apply to the content being viewed by the device, (block 1030—YES), the device may proceed to retrieve the EAS broadcast by requesting the index file and key file corresponding the EAS broadcast (block 1040). The operations of block 1040 may be similar to those described previously in blocks 720-760 of FIG. 7. That is, playback application 500 may request, from content server 130, the appropriate EAS index file 350 corresponding to the EAS broadcast. EAS index file 350 may include a link or other reference to a key needed to decrypt the corresponding EAS content item 320. Because it may not be necessary or desirable to encrypt EAS broadcasts, in some implementations, the decryption key may be a "null" key, which may indicate the EAS broadcast is not encrypted.

Playback application 500 may thus playback the EAS broadcast to the user (block 1040). Playing back the EAS broadcast may include interrupting the content item that was selected by the user. In some implementations, instead of completely interrupting the content item selected by the user, some EAS broadcasts may instead be overlaid on the current content items. For example, a text-based inclement weather alert may be scrolled across the bottom of the screen while the main content item can continue to be received and played by playback application 500.

In one implementation, whether to completely interrupt the content item that was selected by the user or to overlay the content item may be a user configurable option. For example, based on a user option, the EAS broadcast may be shown alongside the user selected content item, such as in two separate windows. Alternatively, the user configurable option relating to how a broadcast is to be interrupted may only apply to some EAS broadcasts. For example, for certain types of EAS broadcasts, such as emergency broadcasts by the president, the user configurable option may be ignored and the EAS broadcast may completely interrupt the user selected broadcast. Other types of EAS broadcasts however, such as inclement weather alerts, may be displayed based on the user configurable option.

At some point, the EAS broadcast may end. Playback application 500 may then resume playback of the desired content that was selected by the user (block 1050).

When the content currently being played by playback application 500 is determined to not be applicable to the EAS broadcast (block 1030—NO), playback application 500 may ignore the EAS broadcast and continue to playback the content selected by the user (block 1060).

Figure 11:
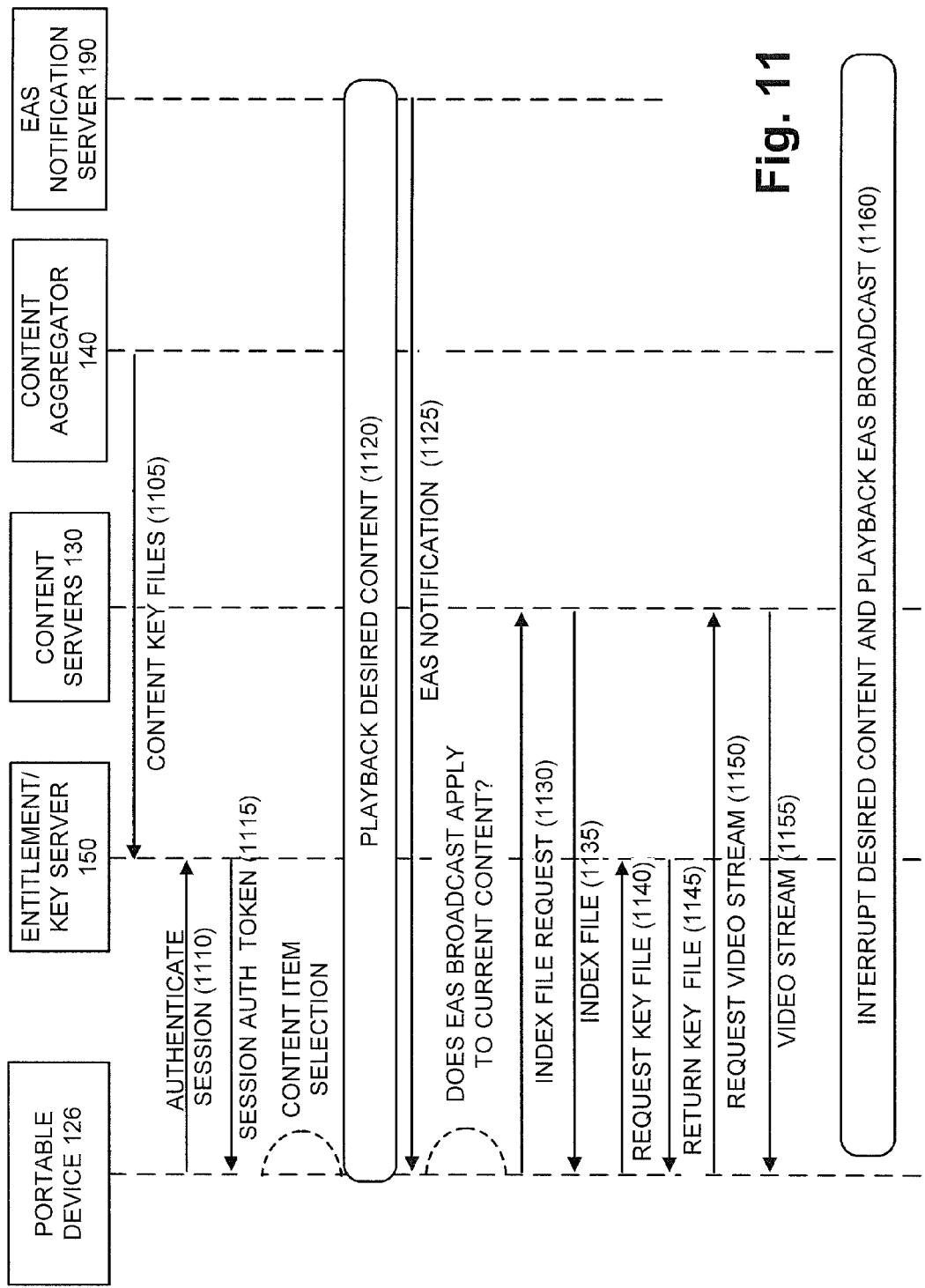
FIG. 11 is signal flow diagram illustrating an example of communications between components during streaming of video content.

FIG. 11 is signal flow diagram illustrating an example of communications between components in environment 100 during streaming of video content. In FIG. 11, assume that a live television channel is streamed to playback application 500, which is executing on a portable device, and an EAS broadcast is generated while the user is viewing the live television channel.

Content aggregator 140, as it aggregates and encrypts incoming content, may upload decryption key files to entitlement/key server 150 (communication 1105). A new key file may be uploaded, for example, every 30 minutes or at every new television channel show or program. EAS broadcasts may also be associated with decryption key files. Alternatively, the decryption key files for EAS broadcasts may indicate that the EAS broadcast is not encrypted.

At some point, such as whenever playback application 500 is initially started, and whenever portable device 126 changes network connections, playback application 500 may contact entitlement/key server 150 (or, alternatively, authentication server 180) to authenticate the current session (communication 1110). As mentioned above, the session authentication may include determining the geographic location of portable device 126. An encrypted session authorization token may be passed back to playback application 500 (communication 1115). The session authorization token may only be valid for the current communication session with authentication server 180. In some implementations, the session authorization token may indicate the user's location or include other information.

At some point, the user may select a particular content item to view. In response, playback application 500 may playback the desired content for the user of the portable device, as described with respect to blocks 720-760 in FIG. 7, and as illustrated in FIG. 11 as "playback desired content 1120."

At some point, assume that, in response to an emergency event, an EAS broadcast is generated by a government authority. The EAS broadcast may be relevant to particular geographic region(s). EAS notification server 190 may determine, based on region information associated with each online portable device (e.g., each portable device playing back content through playback application 500), which portable devices should receive an EAS notification. EAS notification server 190 may then transmit an EAS notification to each determined portable device (communication 1125).

In some implementations, a portable device that receives the EAS notification may determine whether the current content being viewed at the portable device is one that should be interrupted for the EAS broadcast. In FIG. 11, assume that the content being shown by the portable device is a live television broadcast that should be interrupted.

The portable device may request the EAS broadcast, from content servers 130, so that the portable device can play the EAS broadcast referenced by the notification. In particular, as shown in FIG. 11, playback application 500 may request the index file corresponding to the EAS broadcast (communication 1130). The index file may be received from content servers 130 (communication 1135).

The index file may contain a link to the key file for the EAS broadcast. Playback application 500 may thus use the index file to request the key file from entitlement/key server 150 (communication 1140). Entitlement/key server 150 may validate the user's session, such as by validating an encrypted session token that is passed to entitlement/key server 150 as part of the key file request. If the validation is successfully, the key file may then be returned to playback application 500 (communication 1145). As previously mentioned, for an EAS broadcast, the EAS broadcast may not be encrypted. In this case, the key file may be a "null" key file that indicates encryption is not used.

Playback application 500 may request the EAS broadcast from content servers 130 (communication 1150). The video content may then be streamed to playback application 500 over content delivery network 110 (communication 1155). The streamed video content may be, for example, streamed "over the top" through an IP packet-based network. Playback application may then interrupt the video content that is currently being played and may playback the EAS broadcast (1160).

As described above, video content may be streamed to a portable communication device. EAS broadcasts relevant to the portable communication device may interrupt user-selected content that is being viewed at the portable communication device. Whether to provide an EAS broadcast to a particular portable device may be based on geographic region information associated with the portable device and possibly also on the type of content that is being shown on the portable device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components and/or logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by one or more computing devices, the method comprising:
    streaming, by the one or more computing devices, first video content over an Internet Protocol (IP) network to a portable device;
    determining, by the one or more computing devices, an indication of a location of the portable device;
    determining, by the one or more computing devices, whether the location of the portable device is in a geographic region covered by an emergency alert system (EAS) broadcast;
    determining, by the one or more computing devices, whether the first video content being streamed to the portable device includes content that is exempt from the EAS broadcast;
    transmitting, by the one or more computing devices, in response to determining that the portable device is in the geographic region covered by the EAS broadcast and in response to determining that the first video content being streamed includes content that is not exempt from the EAS broadcast, a notification to the portable device, the notification instructing the portable device to interrupt the first video content with video content corresponding to the EAS broadcast;
    streaming, by the one or more computing devices, the video content corresponding to the EAS broadcast to the portable device, wherein the video content of the EAS broadcast comprises a plurality of separately encoded sections, and
    wherein each of the plurality of separately encoded sections is encrypted with a different key.

2. The method of claim 1, further comprising:
    receiving, from the portable device, a request for the video content corresponding to the EAS broadcast, the request being issued in response to reception of the notification by the portable device.

3. The method of claim 1, further comprising:
    receiving the EAS broadcast from a government entity.

4. The method of claim 1, where the notification instructing the portable device to interrupt the first video content corresponding to the EAS broadcast completely interrupts the first video content or is simultaneously broadcast with the first video content based on a user configurable option.

5. The method of claim 1, where the indication of the location of the portable device includes an indication of whether the portable device is in a geographic location corresponding to customer premises of an account associated with the portable device.

6. The method of claim 1, where the indication of the location of the portable device is determined based on an Internet Protocol (IP) address or media access control (MAC) address of an access point to which the portable device is connected.

7. The method of claim 1, where streaming the video content corresponding to the EAS broadcast includes:
    transmitting an index file to the portable device, the index file including a reference to a key file needed to decode the video content corresponding to the EAS broadcast; and
    transmitting the key file to the portable device.

8. The method of claim 1, where the portable device includes a tablet computer, a smart phone, or a laptop computer.

9. The method of claim 1, further comprising:
    transmitting the notification to the portable device only when the first video content corresponds to a television channel.

10. A non-transitory computer-readable storage medium containing programming instructions for execution by one or more processors, the computer-readable medium comprising:
    instructions to stream first video content over an Internet Protocol (IP) network to a portable device;
    instructions to determine an indication of a location of the portable device;
    instructions to determine whether the location of the portable device is in a geographic region covered by an emergency alert system (LAS) broadcast;
    instructions to determine whether the first video content being streamed to the portable device includes content that is exempt from the EAS broadcast;
    instructions to transmit, in response to determining that the portable device is in the geographic region covered by the EAS broadcast and in response to determining that the first video content includes content that is not exempt from the EAS broadcast, a notification to the portable device, the notification instructing the portable device to completely interrupt the first video content or to simultaneously broadcast the first video content with video content corresponding to the EAS broadcast; and
    instructions to stream the video content corresponding to the EAS broadcast to the portable device, wherein the EAS broadcast comprises encrypted sections.

11. The non-transitory computer-readable storage medium of claim 10, the computer-readable medium further comprising:
    instructions to receive the EAS broadcast from a government entity.

12. The non-transitory computer-readable storage medium of claim 10, where the portable device includes a tablet computer, a smart phone, or a laptop computer.

13. The non-transitory computer-readable storage medium of claim 10, the computer-readable medium further comprising:
    instructions to transmit the notification the portable device only when the first video content corresponds to a television channel.

14. A portable communication device comprising:
    a processor;
    a display; and a computer readable medium including programming instructions, that when executed by the processor, cause the processor to:

playback first video content, streamed from a content server over an Internet Protocol (IP) network, via the display;

receive a notification that an emergency alert system (EAS) broadcast has been issued for a geographic region corresponding to a geographic region of the portable device;

determine whether the EAS broadcast applies to the first video content;

receive, streaming video content corresponding to the EAS broadcast, wherein the EAS broadcast comprises a plurality of separately encoded and encrypted sections; and interrupt the first video content with the EAS broadcast when the EAS broadcast is determined to apply to the first video content.

15. The portable communication device of claim 14, where the computer readable medium further includes programming instructions to:

resume playback of the first video content when the EAS broadcast is complete.

16. The portable communication device of claim 14, where the computer readable medium further includes instructions to:

obtain a key file to playback the EAS broadcast.

17. The portable communication device of claim 14, where the portable communication device includes a tablet computer, a smart phone, or a laptop computer.

18. A system, comprising:

a content server to receive and store video content items for streaming, over an Internet Protocol (IP) network, to a plurality of portable devices, at least one of the video content items corresponding to an emergency alert system (EAS) broadcast that is associated with a geographic area, wherein the at least one of the video content items corresponding to the EAS broadcast comprises a plurality of separately encoded and encrypted sections;

an entitlement server to authenticate the portable devices that are to output the video content items provided by the content server and to maintain an indication of the geographic region of each of the authenticated portable devices;

EAS notification server to determine whether the at least one of the video content items is exempt from the EAS broadcast; and wherein the EAS notification server instructs, in response to receiving the EAS broadcast, each of the portable devices that are in the geographic region associated with the EAS broadcast and are outputting the at least one of the video content items that is not exempt from the EAS broadcast, to obtain and playback the EAS broadcast from the content server.

19. The system of claim 18, further comprising:

an EAS message generator to, in response to reception of the EAS broadcast from a government authority, transmit the EAS broadcast to the content server and inform the EAS notification server of the reception of the EAS broadcast.

20. The system of claim 18, where the EAS notification server instructs each of the portable devices to determine the manner of interrupting a currently viewed video content item for the EAS broadcast.

21. The system of claim 18, further comprising:

a content aggregator to encrypt, with different encryption keys, the video content items and provide the encrypted video content items to the content server.

* * * * *